United States Patent [19]

Horiguchi et al.

[11] Patent Number: 4,760,772
[45] Date of Patent: Aug. 2, 1988

[54] VEHICLE AIR-CONDITIONING CONTROL APPARATUS

[75] Inventors: Hiyosei Horiguchi; Akira Tezuka, both of Katsuta, Japan

[73] Assignee: Hitachi, Ltd., Tokyo, Japan

[21] Appl. No.: 127,755

[22] Filed: Dec. 2, 1987

[51] Int. Cl.$^4$ ............................................. B60H 1/00
[52] U.S. Cl. ........................................ 98/2.01; 165/28; 250/203 R
[58] Field of Search ............... 165/28, 43; 98/2.01; 236/49 D, 91 R, 91 C; 126/425; 250/203 R

[56] References Cited

U.S. PATENT DOCUMENTS

| | | | |
|---|---|---|---|
| 4,498,768 | 2/1985 | Holl | 250/203 R |
| 4,687,923 | 8/1987 | Bauck | 126/425 X |

FOREIGN PATENT DOCUMENTS 58-36912 9/1981 Japan.
60-179321 9/1985 Japan.

Primary Examiner—William E. Wayner
Attorney, Agent, or Firm—Antonelli, Terry & Wands

[57] ABSTRACT

In a vehicle air-conditioning control apparatus for controlling the temperature and amount of air to be supplied to the interior of a vehicle room to control the air temperature in the room to a command value, a sunlit illumination sensor is provided including a plurality of photodetectors which have sensitivity characteristics varying with an incident angle of light and which are so arranged as to be oriented in different directions, an incident angle calculator is provided which calculates, on the basis of output signals of the photodetectors, an angle the sunlight ray makes to either of the righthand side and lefthand side of the vehicle and an angle of elevation of the sun relative to the horizontal plane of the vehicle, and distribution of air supply amounts on a horizontal plane within the room is controlled in accordance with calculated values delivered out of the incident angle calculator.

17 Claims, 14 Drawing Sheets

FIG. 7

|  |  |  |  | $+\theta_2$ $+90°$ |  |  |
|---|---|---|---|---|---|---|
| O | O | +1V | +2V | +2V | +2V | |
|  |  |  |  | +60° | | |
| O | O | +2V | +3V | +3V | +2V | |
|  |  |  |  | +30° | | |
| O | O | +1V | +2V | +3V | +2V | |
| $-\theta_1$ -90° | -60° | -30° | 0 | +30° | +60° | +90° $+\theta_1$ |
| O | O | +1V | +2V | +3V | +2V | |
|  |  |  |  | -30° | | |
| O | O | +2V | +3V | +3V | +2V | |
|  |  |  |  | -60° | | |
| O | O | +1V | +2V | +2V | +2V | |
|  |  |  |  | -90° $-\theta_2$ | | |

FIG. 8

|  |  |  |  | $+\theta_2$ $+90°$ |  |  |
|---|---|---|---|---|---|---|
| C | C | L | L | L | C | |
|  |  |  |  | +60° | | |
| C | C | L | L | C | C | |
|  |  |  |  | +30° | | |
| C | C | C | C | C | C | |
| $-\theta_1$ -90° | -60° | -30° | 0 | +30° | +60° | +90° $+\theta_1$ |
| C | C | C | C | C | C | |
|  |  |  |  | -30° | | |
| C | C | R | R | C | C | |
|  |  |  |  | -60° | | |
| C | C | R | R | R | C | |
|  |  |  |  | -90° $-\theta_2$ | | |

VEHICLE AIR-CONDITIONING CONTROL APPARATUS

BACKGROUND OF THE INVENTION

This invention relates to an air-conditioning control apparatus on board vehicles such as automobiles and more particularly to a vehicle air-conditioning control apparatus capable of properly correcting changes in sensible temperature within the vehicle room which are due to changes in the sunlight ray incident to the interior of a vehicle.

The sensible temperature within the room of a vehicle, for example, an automobile greatly changes depending on an incident condition of the sunlight ray. Accordingly, in order to maintain a comfortably air-conditioned state, it is desirable that a temperature distribution on a horizontal plane within the room be controlled in accordance with a condition of the sunlight ray incident upon the automobile. The controlling of the temperature distribution is called sunlit illumination correction.

Incidentally, sunlit illumination correction is adopted in conventional air conditioners as described in, for example, Japanese Utility Model Unexamined Publication Nos. (JU-A) 58-36912 and JP-A-60-179321. In JU-A-58-36912, a plurality of photoelectric conversion elements are employed which are arranged to receive the sunlight ray at different incident angles, a larger output signal is selected from output signals, responsive to sunlit illumination amounts, of the conversion elements, and the air conditioner is operated for temperature control on the basis of the selected signal. The photoelectric conversion element has poor sensitivity to an obliquely incident ray but the use of the plurality of photoelectric conversion elements can prevent inconvenience of inaccurate measurement of the sunlit illumination amounts. Therefore, this prior art apparatus does not intend to detect a direction in which the sunlight ray irradiates the vehicle body.

In No. JP-A-60-179321, a plurality of photoelectric conversion elements are arranged at various locations of the vehicle body, the magnitude relation among output signals of the photoelectric conversion elements is used to decide whether the sunlight ray irradiates the righthand side or lefthand side of the vehicle body, and amounts of air fed to respective air discharge ports provided at various locations within the room are controlled in accordance with a decision result.

Thus, the latter prior art apparatus performs air-conditioning control by merely detecting whether the sunlight ray irradiates the righthand side or lefthand side of the body. This prior art apparatus therefore fails to take into consideration air-conditioning control which can follow slight changes in sunlit illumination direction and faces a problem that it is unsatisfactory for achieving sufficiently comfortably controlled air conditioning.

The sunlit illumination correction mentioned hereinbefore is needed because many automobiles have a roof and the sunlit illumination amount applied to the righthand seat of the vehicle differs from that applied to the lefthand seat, depending on the sunlit direction. However, the difference in the sunlit illumination amount not only depends on whether the sunlit illumination direction is toward the righthand side or lefthand side of the vehicle but also is affected by an angle of the sunlight ray makes to the righthand side or lefthand side of the vehicle and by an angle of elevation of the sun relative to the horizontal plane of the vehicle.

This accounts for the fact that only the decision as to whether the sunlit illumination direction is toward the righthand side or lefthand side of the vehicle is insufficient to maintain a sufficiently comfortably air-conditioned state.

SUMMARY OF THE INVENTION

This invention contemplates elimination of the disadvantages of the prior arts and has for its object to provide a vehicle air-conditioning control apparatus capable of constantly correcting the sunlit illumination in accordance with sunlit states so as to maintain a sufficiently comfortable air-conditioned state.

According to the invention, to accomplish the above object, a sunlit illumination sensor is provided including a plurality of photodetectors which each has sensitivity characteristics varying with an incident angle of light and which are so arranged as to be oriented in different directions, an incident angle calculator is provided which calculates, on the basis of output signals of the photodetectors, an angle of the sunlight ray makes to either of the righthand side and lefthand side of the vehicle and an angle of elevation of the sun relative to the horizontal plane of the vehicle, and distribution of air supply amounts on a horizontal plane within the vehicle room is controlled in accordance with calculated values delivered out of the incident angle calculator.

With an air-conditioning control apparatus constructed as above, distribution of air amounts supplied to air-condition the room can be controlled delicately in accordance with an incident condition of the sunlight ray so as to sufficiently eliminate non-uniformity of sensible temperature due to changes in sunlit illumination.

BRIEF DESCRIPTION OF THE DRAWINGS

FIGS. 7 and 8 are diagrams showing examples of maps stored in a ROM.

DESCRIPTION OF THE PREFERRED EMBODIMENTS

A vehicle air-conditioning control apparatus of the invention will now be described by way of example with reference to the accompanying drawings.

FIGS. 1 to 13 illustrate an embodiment of the invention in which as an example, the invention is applied to sunlit illumination correction in an automobile automatic air conditioner of reheating/air mixing type. Controlling of the sunlit illumination correction will be outlined as below.

(1) Mode correction: When intensity of the sunlight ray exceeds a predetermined value, the mode of air discharge to the interior of the room is shifted.

(2) Blower motor voltage correction: In accordance with intensity and direction of the sunlight ray, a voltage $V_M$ applied to a blower motor is increased to increase the flow rate of air fed to a discharge port.

(3) Flow rate distribution correction at a VENT discharge port: The distribution ratio between flow rates at righthand and lefthand sides of the VENT discharge port is changed in accordance with a direction of the sunlight ray.

Figure 1:
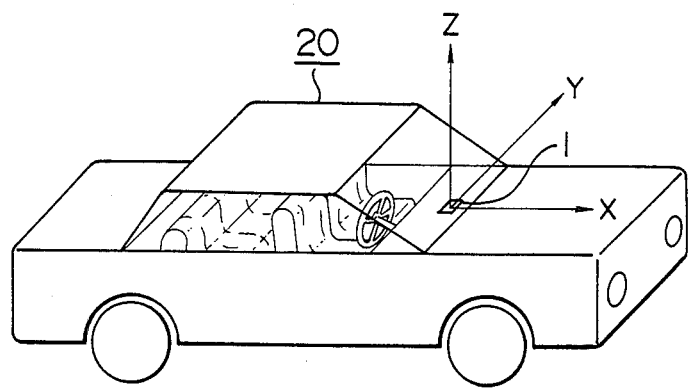
FIG. 1 is a perspective view of an automobile to which a vehicle air-conditioning control apparatus of the invention is applied.

In this embodiment, a sunlit illumination sensor 1 comprised of a plurality of photoelectric conversion elements such as photodiodes is disposed, for example, on a dashboard under and internal of a front glass window of an automobile 20, as shown in FIG. 1. In the automobile shown in FIG. 1, a front/rear direction on a vehicle horizontal plane is represented by an X axis, a right/left direction on the horizontal plane is represented by a Y axis and a direction vertical to the horizontal plane is represented by a Z axis.

Figure 2A:
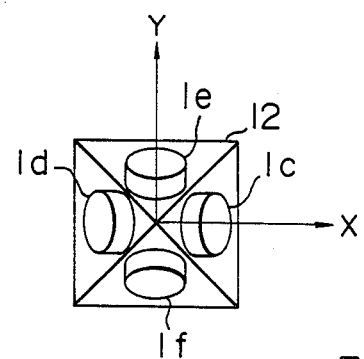
FIGS. 2A, 2B and 2C are diagrams showing an example of a sunlit illumination sensor used in the invention, as viewed in Z, X and Y directions of FIG. 1, respectively.
Figure 2B:
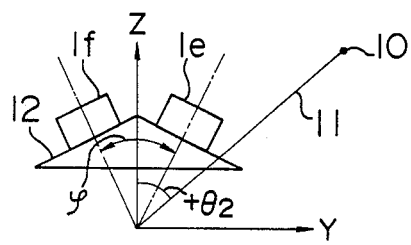
Figure 2C:
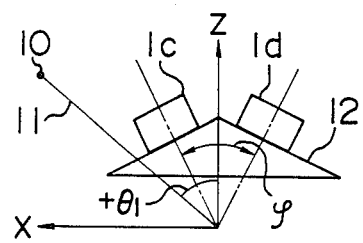

A typical example of the sunlit illumination sensor 1 used in the present invention comprises, for example, four photodiodes which are detailed in FIG. 2A as viewed from the Z direction, in FIG. 2B as viewed from the X direction and in FIG. 2C as viewed from the Y direction. The four photodiodes are herein designated by 1c, 1d, 1e and 1f, respectively, and the incident direction of the sunlight ray is divided into two angular components which are respectively represented by $\theta_1$ shown in FIG. 2C and $\theta_2$ shown in FIG. 2B. Thus, in FIGS. 2B and 2C, reference numeral 10 designates the sun and 11 the sunlight ray. The photodiodes are mounted on a stand 12. Each of the four photodiodes has a light receiving surface which faces the upwardness as viewed from the top of the vehicle body. One pair of photodiodes 1c and 1d are arranged along the X axis and the other pair of photodiodes 1e and 1f are arranged along the Y axis. The photodiodes 1c and 1d are symmetrical to the Z axis and inclined to make an angle $\phi$ therebetween. The photodiodes 1e and 1f are also symmetrical to the Z axis and inclined to make an angle, for example $\phi$, therebetween. Since the detection angle range is narrowed as $\phi$ decreases and as the $\phi$ increases the detection angle range is widened but the detection accuracy is degraded, the angle $\phi$ is selected to be 10° to 60°, preferably, 30° to 50°.

Figure 3:
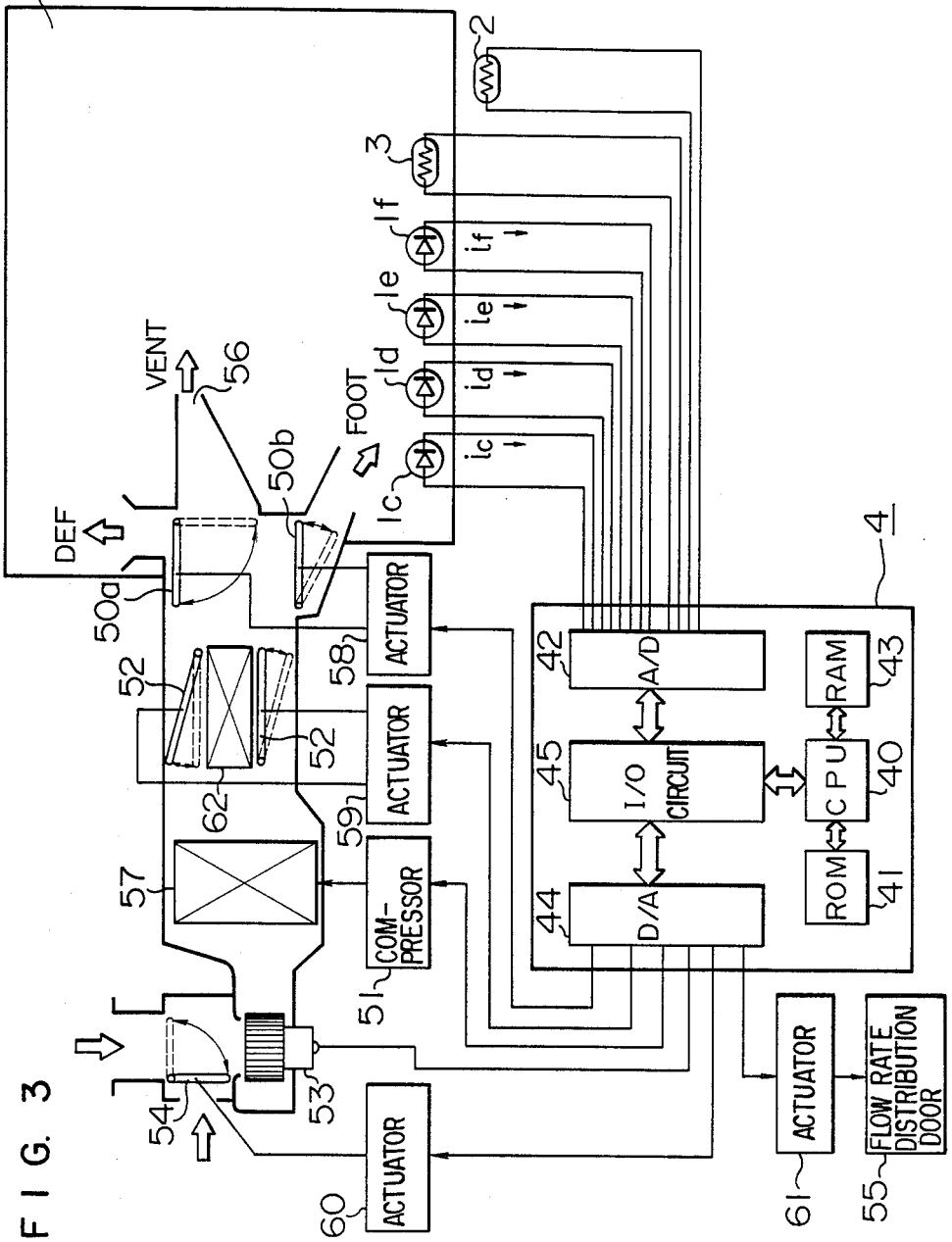
FIG. 3 is a schematic circuit diagram showing an air-conditioning control apparatus according to a first embodiment of the invention.

An air-conditioning control apparatus according to an embodiment of the invention is illustrated, in schematic block form, in FIG. 3. The apparatus comprises an external air temperature sensor 2, an internal air temperature sensor 3, and a controller 4. The interior of the vehicle room is indicated by 22.

The controller 4 includes an A/D converter 42 adapted to convert analog output signals of the sensors 2, 3 and photodiodes 1c to 1f into digital signals, an input/output (I/O) circuit 45, a CPU 40 adapted to calculate control signals for various units on the basis of output signals of the A/D converter 42, a ROM 41, a RAM 43 and a D/A converter 44 adapted to convert the control signals into analog signals which in turn are supplied to the various units.

The control signals sent from the D/A converter 44 are applied to an actuator 58 to control open/close of mode doors 50a and 50b, applied to an actuator 59 to control open/close of an air mixing door 52, applied to an actuator 60 to control open/close of an intake door 54, and applied to an actuator 61 to control open/close of a flow rate distribution door 55. Further, the control signals are also applied to a compressor 51 to control an evaporator 57 and to a blower motor 53 to control its speed. Denoted by 62 is a heater core and by 56 is a VENT discharge port. In the manner described as above, air-conditioning control is properly carried out on the basis of the output signals from the sensors.

As shown in FIG. 3, the photodiodes 1c, 1d, 1e and 1f produce output currents $i_c$, $i_d$, $i_e$ and $i_f$, respectively.

Figure 4:
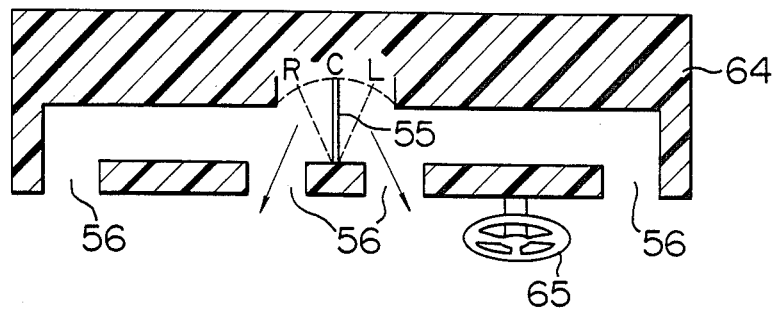
FIG. 4 is a fragmentary sectional view showing a VENT discharge port and its neighborhood within the vehicle room.

Referring to FIG. 4, the flow rate distribution door 55 is specifically illustrated which is operative to change the distribution ratio between flow rates at righthand and lefthand sides of the VENT discharge port 56. In FIG. 4, there are also seen a dashboard 64 and a handle 65. The flow rate distribution door 55 is controlled by the actuator 61 so as to selectively take one of three positions R, C and L as shown, so that the flow rate directed to the righthand side within the room, for example, the driver seat becomes larger when the door 55 is at the R position, the flow rate directed to the lefthand side, for example, the side seat becomes larger when at the L position, and the flow rates directed to the righthand and lefthand sides are made equal to each other when at the C position.

Sunlit illumination correction may be controlled in this embodiment as will be described below with reference to a flow chart of FIG. 5. The flow chart is executed in accordance with a program stored in the ROM 41.

In step 101, the sum $i_t$ of output currents $i_c$, $i_d$, $i_e$ and $i_f$ produced from the photodiodes 1c, 1d, 1e and 1f is calculated. Since the photodiodes 1c, 1d, 1e and 1f are oriented differently as is clear from the foregoing description, the sum current $i_t$ is substantially proportional to intensity of the sunlight ray regardless of its direction.

In step 102, it is decided whether the current $i_t$ exceeds a predetermined value $i_o$. The predetermined value $i_o$ is representative of a sum current $i_t$ which occurs when intensity of the sunlight ray is at a minimum for which sunlit illumination correction is required. Accordingly, with the current $i_t$ being in excess of the predetermined value $i_o$, sunlit illumination correction is decided to be necessary and the procedure proceeds to step 103 but contrarily, with the current $i_t$ being below $i_o$, sunlit illumination correction is decided to be unnecessary and the procedure returns to the step 101.

Figure 6:
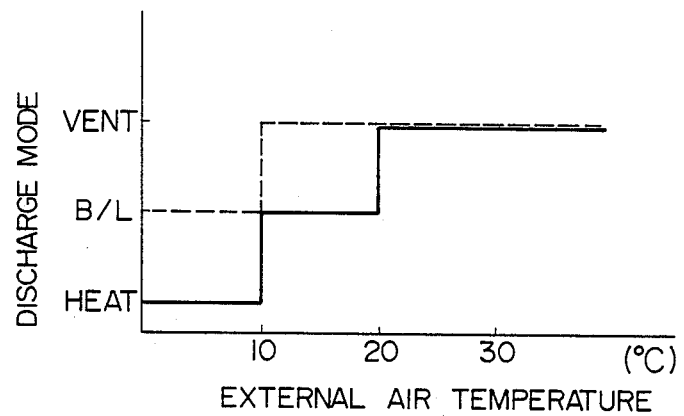
FIG. 6 is a graph showing the relation between air temperature external of the vehicle and air conditioning mode.

In the case of sunlit illumination correction, discharge modes set up for other control than the sunlit illumination correction, for example, discharge mode control based on external air temperatures are shifted in steps 103 to 106. More particularly, in the discharge mode control based on external air temperatures and removed of sunlit illumination correction, the discharge mode is set, as best seen in FIG. 6, to a HEAT mode for external air temperatures of, for example, 10° C. or less, to a B/L mode for external air temperatures ranging, for example, from 10° C. to 20° C. and to a VENT mode for 20° C. or more. However, when the sunlit illumination correction is needed, the HEAT mode is shifted to the B/L mode or the B/L mode to the VENT mode.

Accordingly, the mode doors 50a and 50b are controlled so that air is blown out through a FOOT discharge port and a DEF discharge port in the HEAT mode, air is blown out through the VENT discharge port and FOOT discharge port in the B/L mode and air is blown out through only the VENT discharge port in the VENT mode. Therefore, in the step 103, it is decided whether the discharge mode under the direction of other control than the sunlit illumination correction (such as external air temperature mode control) is the HEAT mode. If the HEAT mode is in use, this mode is shifted to the B/L mode in the step 104 but if the discharge mode is set to a different mode from the HEAT mode, the procedure proceeds to the step 105.

In the step 105, it is likewise decided whether the discharge mode is the B/L mode. If the B/L mode is in use, this mode is shifted to the VENT mode in the step 106 but if the discharge mode is set to the other mode, i.e., the VENT mode, no mode shift is executed and the procedure proceeds to step 107.

In the step 107, the ratio between output currents of each paired photodiodes, i.e., $i_d/i_c$ and $i_f/i_e$, is calculated and calculated ratios are used to calculate sunlight ray incident angles $\theta_1$ and $\theta_2$ which are related to the ratios through a predetermined function as will be described later.

In step 108, obtained values of $\theta_1$ and $\theta_2$ are substituted into maps Map$_1$ and Map$_2$ stored in the ROM 41 to obtain a voltage correction value $\Delta V_M'$ for the blower motor 53 and a door position Door for the flow rate distribution door 55. A signal indicative of the resulting door position Door is applied to the actuator 61 to control the flow rate distribution door 55.

A specific example of the map Map$_1$ is illustrated in FIG. 7. In this example, each of the angles $\theta_1$ and $\theta_2$ covers a range of from $-90°$ to $+90°$ which is divided into six areas. The six areas for $\theta_1$ are combined with the six areas for $\theta_2$ to provide 36 areas in total to which optimum values of $\Delta V_M'$ correspond.

It should be understood from FIG. 7 that when the sunlight is incident upon neighborhood of the front of the vehicle, the voltage applied to the blower motor is increased to increase the flow rate.

The map Map$_2$, on the other hand, is specifically exemplified in FIG. 8 wherein 36 areas are likewise provided in accordance with values of $\theta_1$ and $\theta_2$ and optimum positions of the flow rate distribution door 55 correspond to the 36 areas. It should be understand from FIG. 8 that the flow rate distribution door 55 is transferred to the R position when the sunlight is incident upon the righthand side of the room and to the L position when the sunlight is incident upon the lefthand side.

In step 109, the correction value $\Delta V_M'$ is multiplied by a correction value $i_t/i_m$ complying with intensity of the sunlight ray to provide an ultimate correction value $\Delta V_M$, where $i_m$ is the sum of output currents of the photodiodes $1c$ to $1f$ which occurs when intensity of the sunlight ray is maximum.

In step 110, a fundamental voltage $V_{MLO}$ of the blower motor 53 is added with the correction value $\Delta V_M$ to provide a blower motor voltage $V_M$ which is applied to the blower motor 53. In this manner, the flow rate at the discharge port can be controlled in accordance with intensity and incident angle of the sunlight ray.

In step 111, the control signal is applied to the actuator 59 such that the temperature in the room can be lowered in accordance with the current value $i_t$, thereby controlling the position of the air mixing door 52.

The sunlit illumination sensor 1 detects the sunlight ray angles $\theta_1$ and $\theta_2$ as will be described below. Since the respective angles $\theta_1$ and $\theta_2$ are independently detected by paired two photodiodes, the following description will be given by using two photodiodes $1a$ and $1b$.

Figure 9:
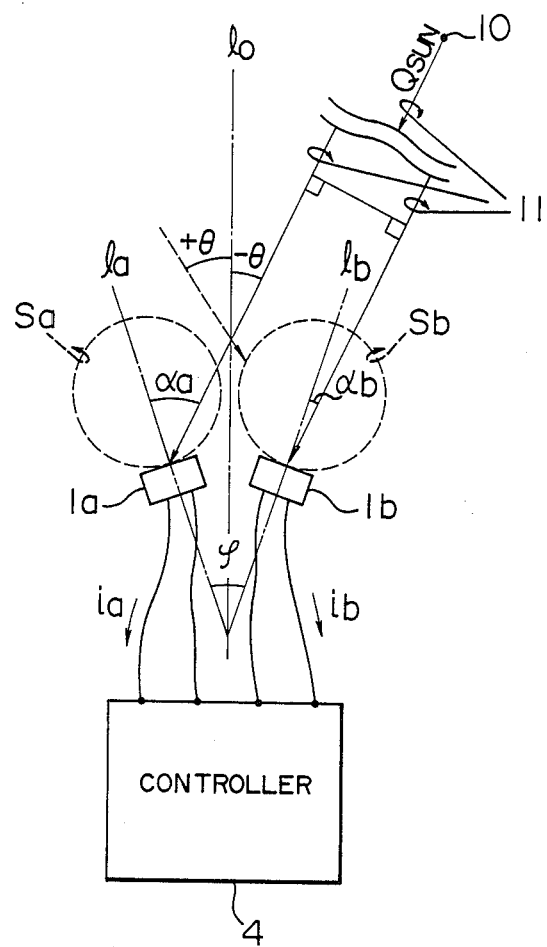
FIG. 9 is a diagram for explaining the operation of the sunlit illumination sensor in the first embodiment of the invention.

Sensitivity of each of the photodiodes $1a$ and $1b$ changes with the incident direction of the sunlight ray and where as shown in FIG. 9 the sunlight ray 11 makes angles $\alpha_a$ and $\alpha_b$ to center axes $l_a$ and $l_b$ of the photodiodes $1a$ and $1b$, respectively, and the sunlight ray intensity is $Q_{SUN}$, output currents $i_a$ and $i_b$ of the photodiodes $1a$ and $1a$ are indicated by $$i_a = Q_{SUN} \times C_1 \cos\alpha_a \qquad (1)$$

$$i_b = Q_{SUN} \times C_1 \cos\alpha_b \qquad (2)$$

wherein $C_1$ is a constant.

Sensitivity characteristics $S_a$ and $S_b$ of the photodiodes $1a$ and $1b$ are defined by $C_1\cos\alpha_a$ and $C_1\cos\alpha_b$ and related to $\alpha_a$ and $\alpha_b$ as diagrammatically shown at dotted circles in FIG. 9, the circles being extended to spheres in three-dimensional treatment.

In FIG. 9, the photodiodes $1a$ and $1b$ are juxtaposed and oriented differently with their center axes making an angle $\phi$ therebetween, and a symmetry axis $l_o$ to which the two photodiodes $1a$ and $1b$ are symmetrical makes an angle $\theta$ to the sunlight ray 11, where the angle $\theta$ is positive $(+\theta)$ when the incident sunlight ray 11 is on the side of the photodiode $1a$ and negative $(-\theta)$ when the incident sunlight ray 11 is on the side of the photodiode $1b$. Then, the angles $\alpha_a$ and $\alpha_b$ are indicated by $$\alpha_a = |\theta - \phi/2| \qquad (3)$$

$$a_b = |\theta + \phi/2| \quad (4)$$

Equations (3) and (4) are substituted into equations (1) and (2) and there result $$i_a = Q_{SUN} \times C_1 \cos|\theta - \phi/2| \quad (5)$$

$$i_b = Q_{SUN} \times C_1 \cos|\theta + \phi/2| \quad (6)$$

By dividing equation (6) by equation (5), $$\frac{i_b}{i_a} = \frac{\cos|\theta + \phi/2|}{\cos|\theta - \phi/2|} \quad (7)$$

is obtained. By dividing equation (5) by equation (6), $$\frac{i_a}{i_b} = \frac{\cos|\theta - \phi/2|}{\cos|\theta + \phi/2|} \quad (8)$$

is obtained.

Equations (7) and (8) indicate that the ratio between currents $i_a$ and $i_b$ is a function of only the angle $\theta$ and unrelated to the sunlight ray intensity $Q_{SUN}$.

Figure 10:
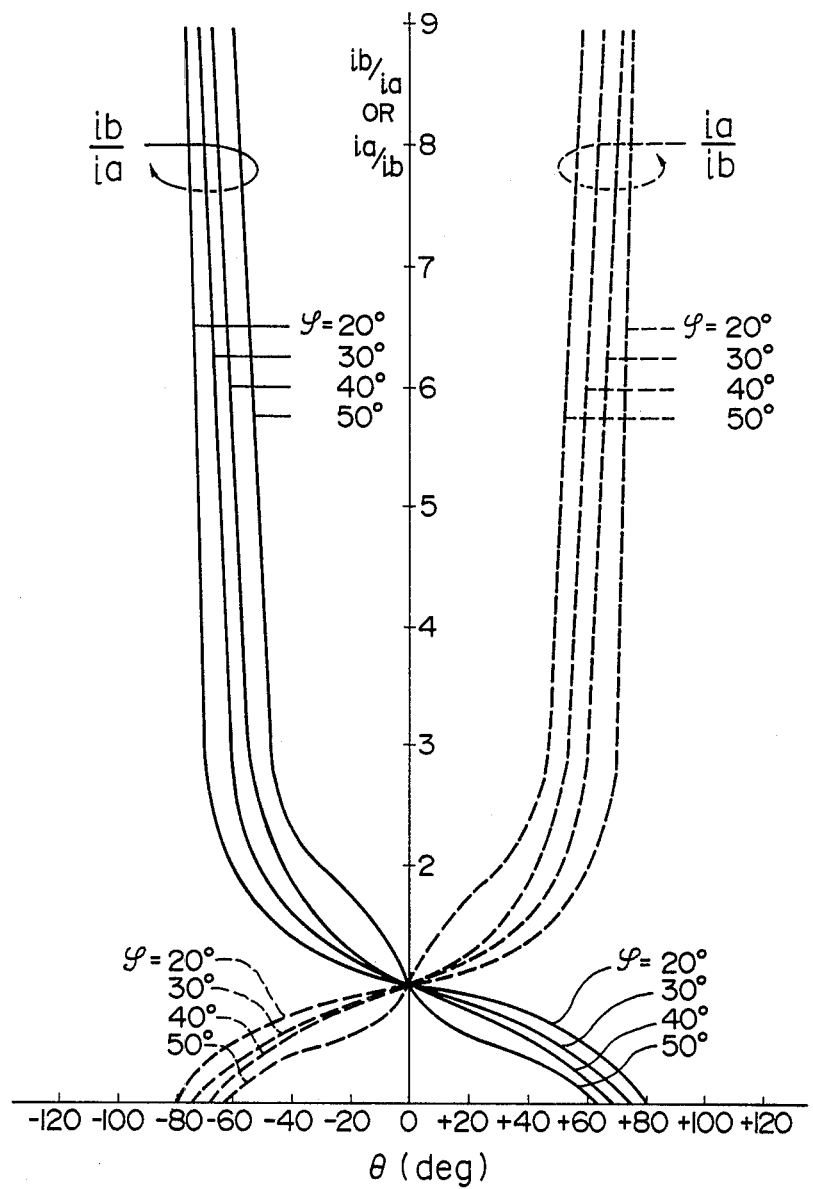
FIG. 10 is a graph showing characteristics of the sunlit illumination sensor shown in FIG. 9.

The ratio between currents $i_a$ and $i_b$ is graphically illustrated in FIG. 10 with respect to the angle $\theta$. As is clear from FIG. 10, each of the ratios $i_b/i_a$ and $i_a/i_b$ is related to the angle $\theta$ in one-to-one correspondence.

Therefore, when the current ratio $i_b/i_a$ or $i_a/i_b$ is calculated, the incident angle $\theta$ of the sunlight ray 11 can be detected on the basis of the calculated value of the current ratio through the medium of the graph of FIG. 10.

The above description is of two-dimensional treatment wherein the sun 10 lies on the same plane as that containing the center axes $l_a$, $l_b$ and symmetry axis $l_o$ as shown in FIG. 10.

Figure 11:
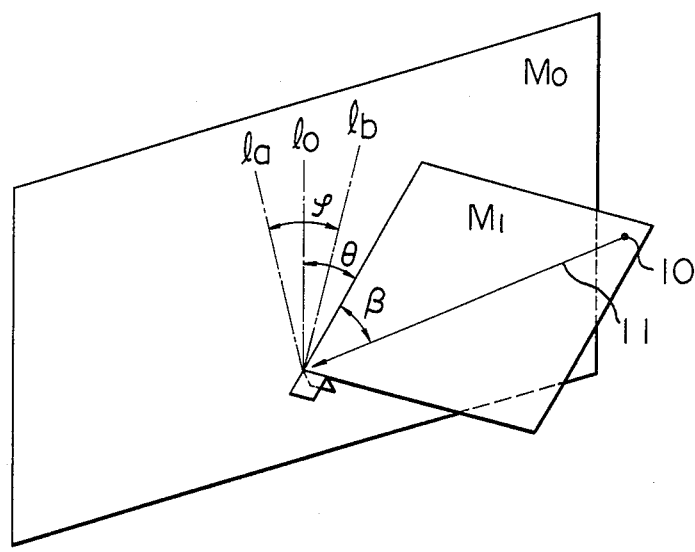
FIG. 11 is a diagram for explaining sensitivity characteristics of the sunlit illumination sensor.
Figure 12:
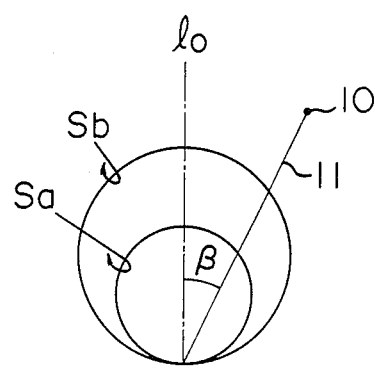
FIG. 12 is a diagram for explaining sensitivity characteristics of photoelectric conversion elements of the sunlit illumination sensor.

In the case of three-dimensional treatment, a plane $M_0$ containing the center axes $l_a$ and $l_b$ and symmetry axis $l_o$ and a plane $M_1$ vertical to the plane $M_0$ are assumed as shown in FIG. 11. The sun 10 lies on the plane $M_1$, the plane $M_1$ is inclined relative to the symmetry axis $l_o$ by an angle $\theta$ (corresponding to $\theta$ in FIG. 9), and the sunlight ray 11 makes an angle $\beta$ to an intersection of the planes $M_0$ and $M_1$. Then, the sensitivity characteristics Sa and Sb which are spherical in terms of three-dimensional treatment are cross-sectioned by the plane $M_1$ and they are illustrated as differently sized circles on the plane $M_1$ as shown in FIG. 12.

By using $\theta$, $\beta$ and $\phi$, the sensitivity characteristics Sa and Sb can be indicated by $$S_a = C_1 \cos|\theta - \phi/2| \times \cos\beta \quad (9)$$

$$S_b = C_1 \cos|\theta + \phi/2| \times \cos\beta \quad (10)$$

By using $\theta$, $\beta$ and $\phi$, the currents $i_a$ and $i_b$ can be indicated by $$i_a = Q_{SUN} C_1 \cos|\theta - \phi/2| \times \cos\beta \quad (11)$$

$$i_b = Q_{SUN} C_1 \cos|\theta + \phi/2| \times \cos\beta \quad (12)$$

Equation (12) is divided by equation (11) to obtain $$\frac{i_b}{i_a} = \frac{\cos|\theta + \phi/2|}{\cos|\theta - \phi/2|} \quad (13)$$

and equation (11) is divided by equation (12) to obtain $$\frac{i_a}{i_b} = \frac{\cos|\theta - \phi/2|}{\cos|\theta + \phi/2|} \quad (14)$$

Equations (13) and (14) exactly equal equations (7) and (8).

Accordingly, it will be appreciated that even when any plane $M_1$ which is vertical to the plane $M_0$ is assumed, the position of the sun lying on the plane $M_1$ does not affect the current ratios $i_b/i_a$ and $i_a/i_b$ and the angle $\theta$ can be detected in the manner which is the same for the two-dimensional and three-dimensional treatments.

Therefore, when characteristics as depicted in FIG. 10 are obtained in advance in connection with one pair of photodiodes 1c and 1d and the other pair of photodiodes 1e and 1f, the angles $\theta_1$ and $\theta_2$ can be determined from the output current ratios $i_c/i_d$ (or $i_d/i_c$) and $i_e/i_f$ (or $i_f/i_e$). Thus, if characteristics of the photodiodes 1c to 1f are exemplarily identical to those of the photodiodes 1a and 1b, the angles $\theta_1$ and $\theta_2$ can be determined from characteristic curves of FIG. 10. In particular, on the assumption that the angle $\phi$ between the photodiodes 1c and 1d as well as between the photodiodes 1e and 1f is, for example, 30°, the angles $\theta_1$ and $\theta_2$ can be approximated from characteristic curves of FIG. 10 as follows:

$$\theta_1 = 80\left(\frac{i_c}{i_d} - 1\right) \text{ where } 0 \leq \frac{i_c}{i_d} \leq 1 \quad (15)$$

$$\theta_1 = 80\left(1 - \frac{i_d}{i_c}\right) \text{ where } 0 \leq \frac{i_d}{i_c} \leq 1 \quad (16)$$

$$\theta_2 = 80\left(\frac{i_e}{i_f} - 1\right) \text{ where } 0 \leq \frac{i_e}{i_f} \leq 1 \quad (17)$$

$$\theta_2 = 80\left(1 - \frac{i_f}{i_e}\right) \text{ where } 0 \leq \frac{i_f}{i_e} \leq 1 \quad (18)$$

Figure 5:
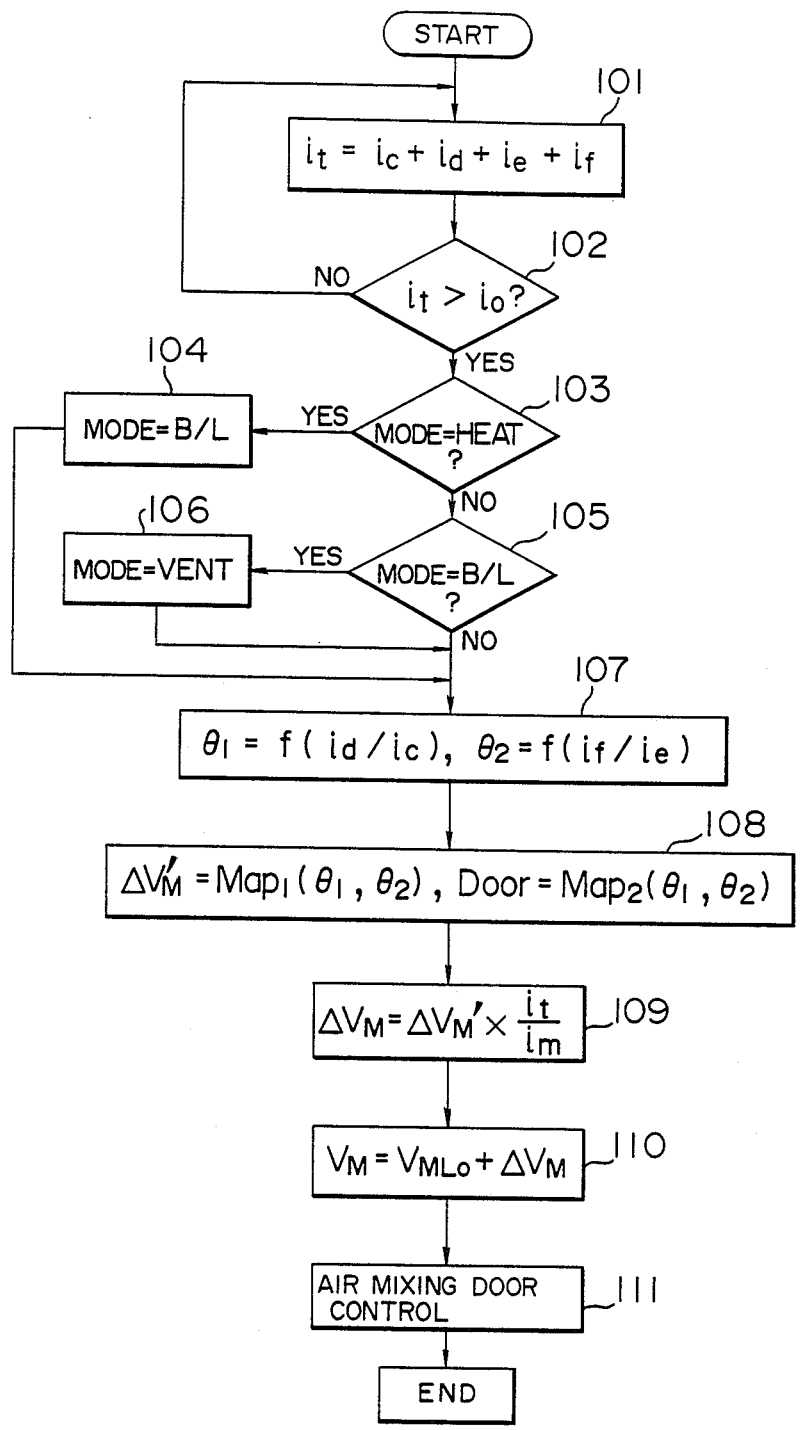
FIG. 5 is a flow chart for explaining the sunlit illumination correcting operation in the first embodiment.

Accordingly, in the step 107 of FIG. 5, the $\theta_1$ may be calculated pursuant to equation (15) or (16) and the $\theta_2$ may be calculated pursuant to equation (17) or (18).

However, in place of calculating the $\theta_1$ and $\theta_2$ pursuant to the approximate equations (15) to (18) obtained from the characteristic curves of FIG. 10 as in the precedence, the characteristics of FIG. 10 may be stored in the ROM 41 as a map and the $\theta_1$ and $\theta_2$ may be read directly from the map in accordance with values of $i_d/i_c$ and $i_f/i_e$.

As described above, according to the foregoing embodiment, the two angular components $\theta_1$ and $\theta_2$ representative of the incident direction of the sunlight ray can be detected separately by means of the sunlit illumination sensor 1 and the sunlit illumination correction can be effected on the basis of the detection results, thereby ensuring that delicate flow rate distribution and the like performance can be attained and hence controlling of sufficiently comfortable air conditioning can be achieved.

Incidentally, in the foregoing embodiment, the output currents $i_c$ to $i_f$ of the photodiodes 1c to 1f included in the sunlit illumination sensor 1 are directly fetched by the controller 4 and the output current ratios are calculated to determine the angle $\theta$, especially, $\theta_1$ and $\theta_2$. But the angles $\theta_1$ and $\theta_2$ may be determined directly from voltages representative of the photodiode output currents, without resort to the calculation of the output current ratios. An embodiment to this effect will now be described by referring to another embodiment of sunlit illumination sensor 1 as illustrated in FIG. 13.

Figure 13:
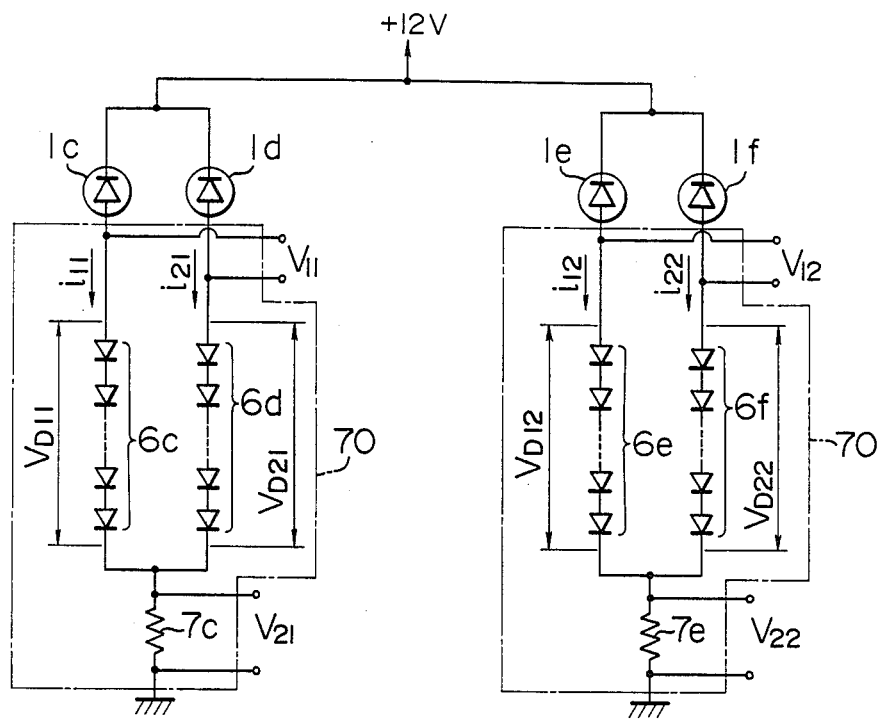
FIG. 13 is a circuit diagram of a sunlit illumination sensor according to a second embodiment of the invention.

A sunlit illumination sensor 1 of FIG. 13 comprises diode trains 6c, 6d, 6e and 6f, load resistors 7c and 7e, and other components which are identical to those of FIG. 3.

Two photodiodes 1c and 1d are respectively connected to the diode trains 6c and 6d to form a bridge circuit and an output voltage $V_{11}$ developing across junctions of the photodiodes and associated diode trains is delivered out.

Similarly, two photodiodes 1e and 1f are respectively connected to the diode trains 6e and 6f to form a bridge circuit and an output voltage $V_{12}$ developing across junctions of these photodiodes and associated diode trains is delivered out.

Each of the diode trains 6c to 6f is a series connection of 10 diodes, for example, known as a type of 1S 2076 and a forward non-linear resistance characteristic of the series connection is utilized.

Respective resistors 7c and 7e have a resistance R of, for example, 1 K$\Omega$ and generate output voltages $V_{21}$ and $V_{22}$.

Where output currents of the photodiodes 1c and 1d are $i_{11}$ and $i_{21}$, the output voltage $V_{11}$ of one bridge circuit and the output voltage $V_{21}$ across the resistor 7c are theoretically given by $$V_{11} = V_{D11} - V_{D21} = b\log i_{11} - b\log i_{21} \quad (19)$$
$$= b\log \frac{i_{11}}{i_{21}}$$

$$V_{21} = R(i_{11}+i_{21}) \quad (20)$$

Figure 14:
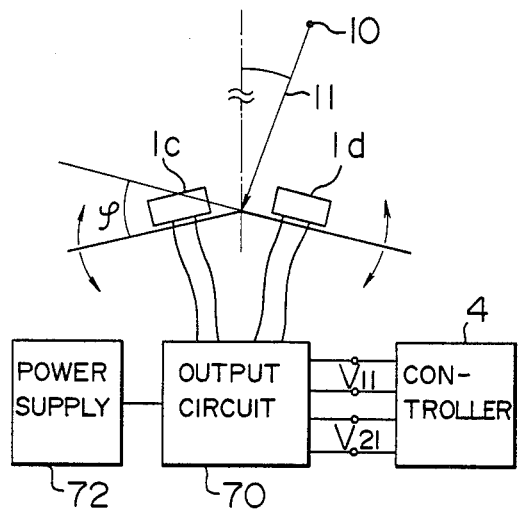
FIG. 14 is a diagram showing a layout of photoelectric conversion elements of the sunlit illumination sensor shown in FIG. 13.

By substituting equations (5) and (6) into equations (19) and (20), there result $$V_{11} = b\log\left(\frac{\cos(\theta + \phi/2)}{\cos(\theta - \phi/2)}\right) \quad (21)$$

$$V_{21} = aR[\cos(\theta+\phi/2)+\cos(\theta+\phi/2)] \times Q_{SUN} \quad (22)$$

where R, a and b are constants and $\phi$ is the angle between the photodiodes 1c and 1d as shown in FIG. 14.

Similarly, the output voltage $V_{12}$ of the other bridge circuit and the output voltage $V_{22}$ across the resistor 7e are given by $$V_{12} = b\log\left(\frac{\cos(\theta + \phi/2)}{\cos(\theta - \phi/2)}\right) \quad (23)$$

$$V_{22} = aR[\cos(\theta+\phi/2)+\cos(\theta+\phi/2)] \times Q_{SUN} \quad (24)$$

where $\phi$ is likewise the angle between the photodiodes 1e and 1f.

Figure 15:
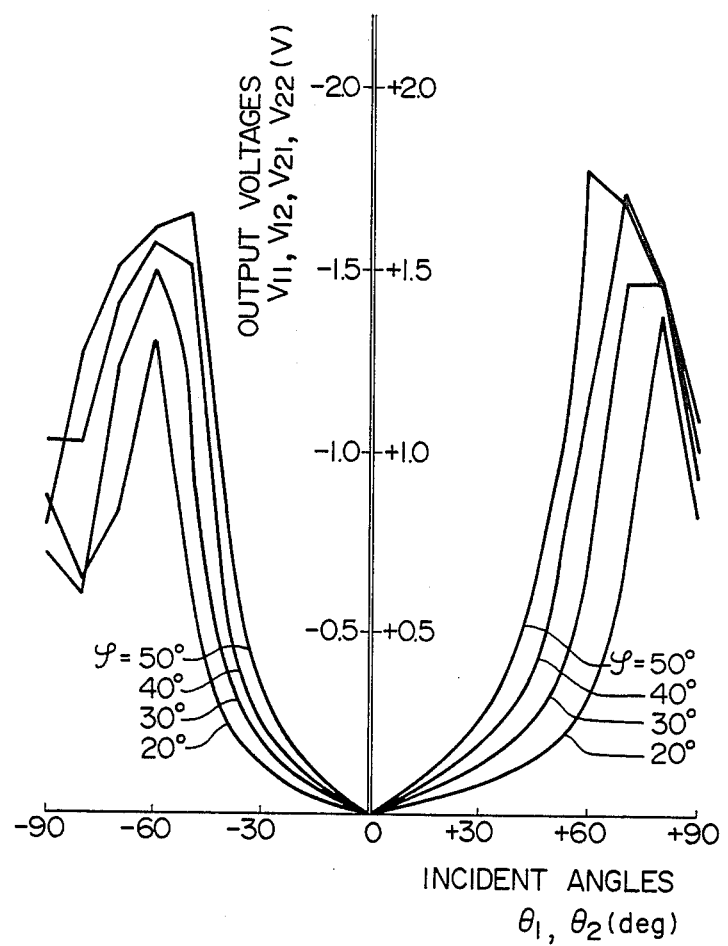
FIG. 15 is a graph showing output characteristics of the sunlit illumination sensor of FIG. 13.

When the photodiodes 1c to 1f have the same sensitivity characteristic, the output voltages $V_{11}$, $V_{12}$ and $V_{21}$, $V_{22}$ are graphically plotted as shown in FIG. 15 with respect to the incident angles $\theta_1$ and $\theta_2$. Accordingly, without determining the ratio between currents $i_{11}$ and $i_{21}$ or $i_{21}$ and $i_{22}$, the angles $\theta_1$ and $\theta_2$ can be known by reading the output voltages $V_{11}$ and $V_{12}$.

More specifically, as shown in FIG. 14, the output currents of the photodiodes 1c, 1d, 1e and 1f are applied to an output circuit 70 comprised of the resistors 7c and 7e and the diode trains, and the output voltages $V_{11}$, $V_{12}$, $V_{21}$ and $V_{22}$ are applied to the controller 4 so as to provide the angles $\theta_1$ and $\theta_2$. In FIG. 14, the photodiodes 1e and 1f are not illustrated and the output circuit 70 is fed from a power supply 72. Now, the manner of determining the incident angles $\theta_1$ and $\theta_2$ from the output voltages $V_{11}$ and $V_{12}$ will be described with reference to FIG. 15.

From FIG. 15, the relation between output voltage $V_{11}$ (or $V_{12}$) and incident angle $\theta_1$ (or $\theta_2$) can be approximated by the following equations (25) to (32) on the assumption that the angle $\phi$ between the photodiodes 1c and 1d as well as between the photodiodes 1e and 1f is, for example, 30°.

$$\theta_1 = 184V_{11} \text{ where } 0 \leq V_{11} \leq 0.25 \quad (25)$$

$$\theta_1 = 22.1V_{11} - 40.5 \text{ where } 0.25 \leq V_{11} \leq 1.47 \quad (26)$$

$$\theta_1 = -117V_{11} \text{ where } -0.3 \leq V_{11} \leq 0 \quad (27)$$

$$\theta_1 = 23.5V_{11} - 28.5 \text{ where } -1.19 \leq V_{11} \leq -0.3 \quad (28)$$

$$\theta_2 = 184V_{12} \text{ where } 0 \leq V_{12} \leq 0.25 \quad (29)$$

$$\theta_2 = 22.1V_{12} - 40.5 \text{ where } 0.25 \leq V_{12} \leq 1.47 \quad (30)$$

$$\theta_2 = -117V_{12} \text{ where } -0.3 \leq V_{12} \leq 0 \quad (31)$$

$$\theta_2 = 23.5V_{12} - 28.5 \text{ where } -1.19 \leq V_{12} \leq -0.3 \quad (32)$$

Figure 16:
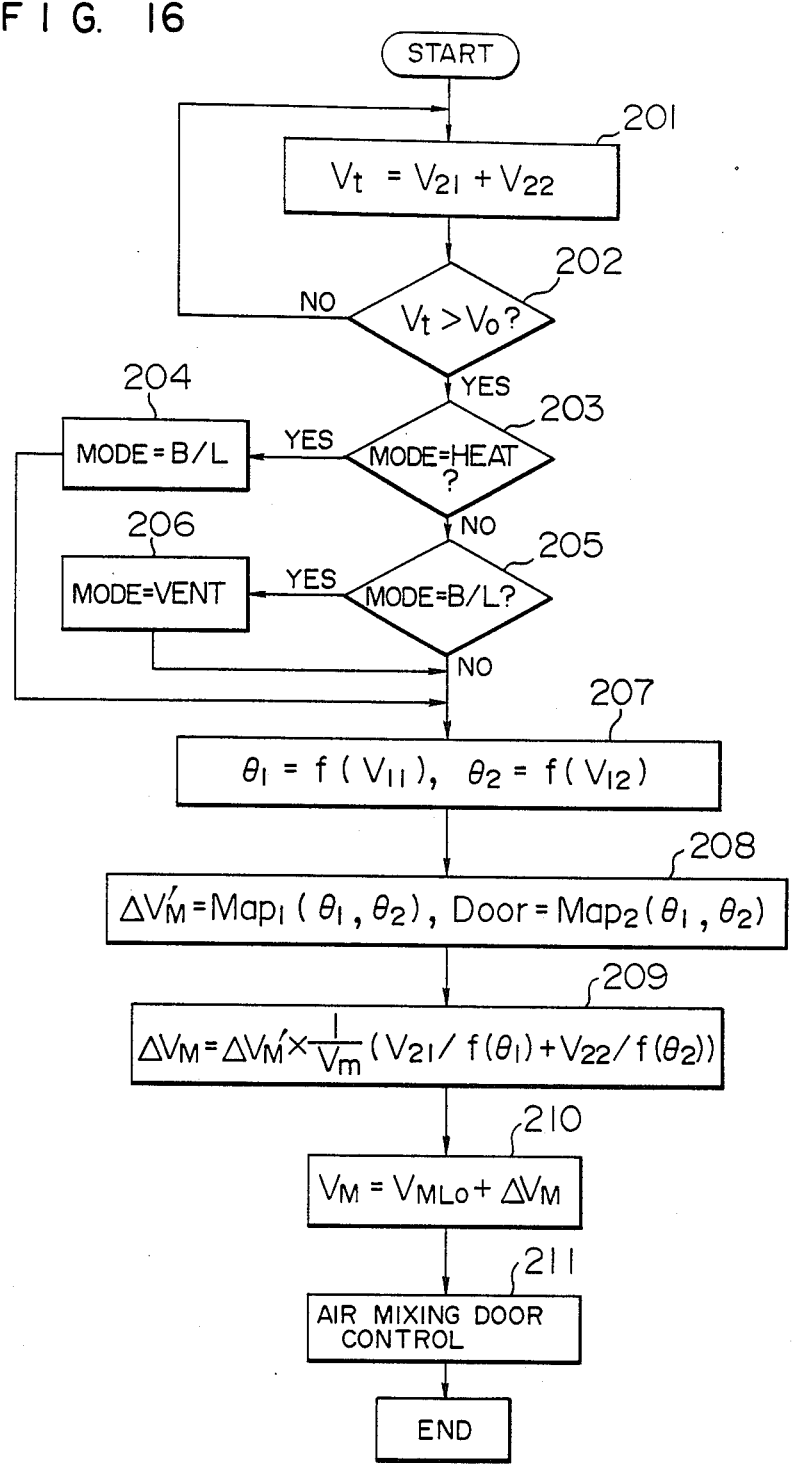
FIG. 16 is a flow chart for explaining the operation of the second embodiment of the invention.

Accordingly, in this embodiment, the step 107 (FIG. 5) for the first embodiment is replaced with a step 207 as shown in a flow chart of FIG. 16 and in the step 207, the angles $\theta_1$ and $\theta_2$ are calculated from the output voltages $V_{11}$ and $V_{12}$ pursuant to equations (25) to (32). The flow chart of FIG. 16 illustrates the overall operation of this embodiment.

In this embodiment, the output voltages $V_{21}$ and $V_{22}$ from the sunlit illumination sensor 1 are representative of intensity of the sunlight ray and they are added together to produce a sum voltage Vt which substitutes for the current $i_t = i_c + i_d + i_e + i_f$ in the step 101 of the first embodiment to indicate the intensity of the sunlight ray.

More particularly, in step 201 of FIG. 16, the sum voltage Vt of the output voltages $V_{21}$ and $V_{22}$ is determined. In step 202, it is decided whether the voltage Vt exceeds a predetermined value Vo. The predetermined value Vo is representative of a sum voltage Vt which occurs when intensity of the sunlight ray is at a minimum for which sunlit illumination correction is required. Accordingly, with the voltage Vt being in excess of the predetermined value Vo, sunlit illumination correction is decided to be necessary and the procedure proceeds to step 203 but contrarily, with the voltage Vt being below Vo, sunlit illumination correction is decided to be unnecessary and the procedure returns to the step 201.

Steps 203 to 206 are identical to the steps 103 to 106 of FIG. 5, respectively.

In step 207, as described previously, the angles $\theta_1$ and $\theta_2$ are calculated from the resulting voltages $V_{11}$ and $V_{12}$ pursuant to equations (25) to (32).

Step 208 is identical to the step 108 of FIG. 5.

In step 209, the correction value $\Delta V_M'$ multiplied by a correction value $V_t/V_m$ complying with intensity of the sunlight ray to provide an ultimate correction value $\Delta V_M$, where $V_m$ is the sum of the output voltages $V_{21}$ and $V_{22}$ which occurs when intensity of the sunlight ray is maximum.

It is herein noted that the output voltages $V_{21}$ and $V_{22}$ of the sunlit illumination sensor do not represent the true intensity of the sunlight ray when the corresponding incident angles $\theta_1$ and $\theta_2$ are small.

Figure 17:
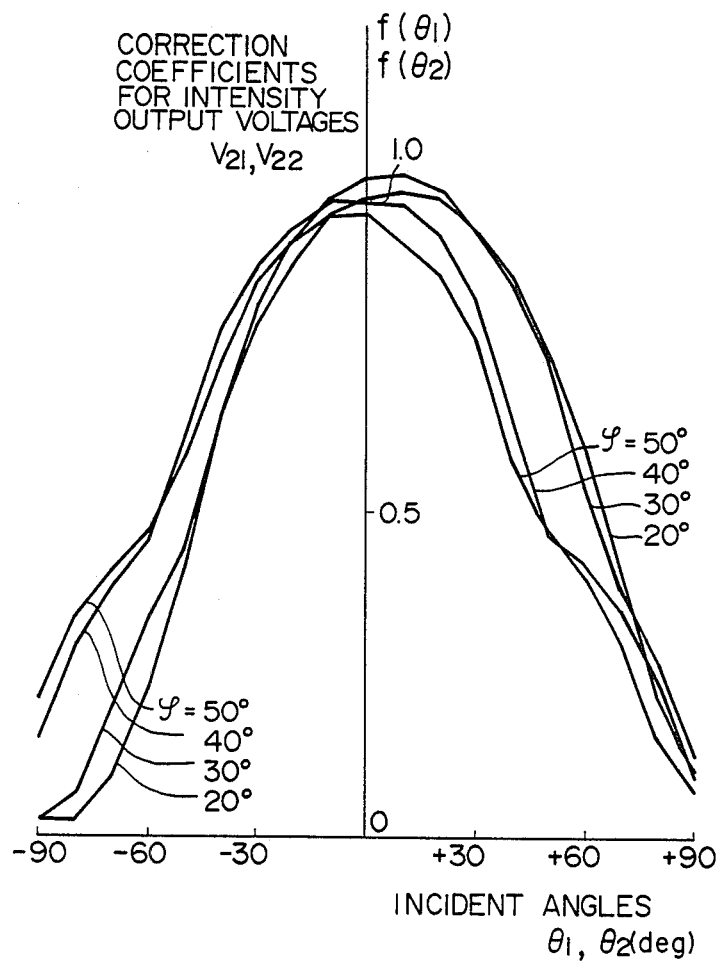
FIG. 17 is a graph showing the relation between correction coefficient for output voltages of the FIG. 13 sunlit illumination sensor and sunlight ray angle.

Accordingly, it is preferable that the output voltages $V_{21}$ and $V_{22}$ be corrected with the angles $\theta_1$ and $\theta_2$, respectively, so as to represent the true intensity of the sunlight ray. FIG. 17 graphically illustrates the relation between angle $\theta_1$ or $\theta_2$ and correction coefficient $f(\theta_1)$ or $f(\theta_2)$ associated with the output voltage $V_{21}$ or $V_{22}$, wherein the relation between angle $\theta_1$ and correction coefficient $f(\theta_1)$ is assumed to be identical to the relation between angle $\theta_2$ and correction coefficient $f(\theta_2)$. Then the incident angles $\theta_1$ and $\theta_2$ are respectively related to the correction coefficients $f(\theta_1)$ and $f(\theta_2)$ through the following approximate equations (33) to (38) if the angle $\phi$ is set to be 30°, for example:

$$f(\theta_1)=1 \text{ where } -10 \leq \theta_1 \leq 27 \quad (33)$$

$$f(\theta_1)=1.353-0.0138\theta_1, \text{ where } 27 \leq \theta_1 \quad (34)$$

$$f(\theta_1)=0.0129\theta_1+2.348, \text{ where } \theta_1 \leq -10 \quad (35)$$

$$f(\theta_2)=1 \text{ where } -10 \leq \theta_2 \leq 27 \quad (36)$$

$$f(\theta_2)=1.353-0.0138\theta_2 \text{ where } 27 \leq \theta_2 \quad (37)$$

$$f(\theta_2)=0.0129\theta_2+2.348 \text{ where } \theta_2 \leq -10 \quad (38).$$

Accordingly, the output voltages for representing the true intensity of the sunlight ray are indicated by $V_{21}/f(\theta_1)$ and $V_{22}/f(\theta_2)$ and hence the true intensity of the sunlight ray is indicated by $V_{21}/f(\theta_1)+V_{22}/f(\theta_2)$, meaning that a correction value complying with the true intensity of the sunlight ray is $(1/V_m)\{V_{21}/f(\theta_1)+V_{22}f(\theta_2)\}$. Therefore, the voltage correction value $\Delta V_M'$ is multiplied by that correction value to provide an ultimate voltage correction value $\Delta V_M$.

Step 210 is identical to the step 110.

In step 211, the position of the air mixing door 52 is controlled such that the temperature in the room is decreased in accordance with the corrected sum voltage value $V_{25}/f(\theta_1)+V_{22}/f(\theta_2)$.

However, in place of calculating the correction coefficients $f(\theta_1)$ and $f(\theta_2)$ pursuant to the approximate equations (33) to (38), the characteristics of FIG. 17 may be stored in the ROM 41 as a map and the incident angles $\theta_1$ and $\theta_2$ may be read out of the map in accordance with values of these correction coefficients.

As described above, according to this embodiment, air-conditioning control can be carried out properly in compliance with the true intensity of the sunlight ray. Obviously, processings in the steps 209 and 211 may otherwise be controlled on the basis of uncorrected voltage values $V_{21}$ and $V_{22}$.

In connection with the first embodiment, it will be appreciated that if correction coefficients $f'(\theta_1)$ and $f'(\theta_2)$ respectively associated with the sum output currents $(i_c+i_d)$ and $(i_e+i_f)$ corresponding to the incident angles $\theta_1$ and $\theta_2$ are determined as in the case of the characteristic graph of FIG. 17, the sum currents $(i_c+i_d)$ and $(i_e+i_f)$ can respectively be corrected to values $(i_c+i_d)/f'(\theta_1)$ and $(i_e+i_f)/f'(\theta_2)$ which are indicative of the true intensity of the sunlight ray.

In this case, the voltage correction value $\Delta V_M$ can be indicated by $$\Delta V_M = \Delta V_M' \times \frac{1}{i_m}\left(\frac{(i_c+i_d)}{f'(\theta_1)} + \frac{(i_e+i_f)}{f'(\theta_2)}\right).$$

In the step 111, the air mixing door can be controlled in accordance with $(i_c+i_d)/f'(\theta_1)+(i_e+i_f)/f'(\theta_2)$.

In this way, even in the first embodiment, air-conditioning control can be carried out in compliance with the true intensity of the sunlight ray.

Figure 18A:
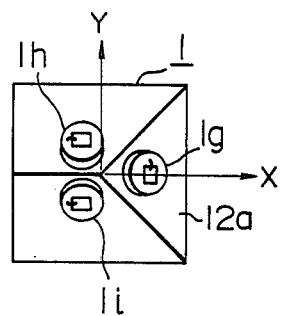
FIGS. 18A, 18B and 18C are diagrams showing a sunlit illumination sensor according to a third embodiment of the invention.
Figure 18B:
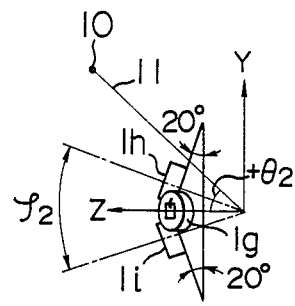
Figure 18C:
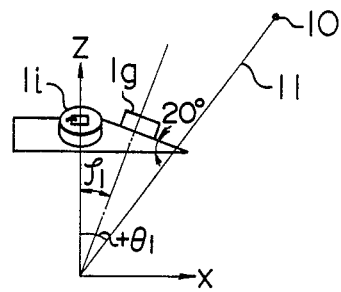

A third embodiment of sunlit illumination sensor 1 may typically be constructed as illustrated, in plan view form, front view form and side view form, in FIGS. 18A, 18B and 18C. In these figures, the X-axis direction coincides with the front direction of the vehicle.

In this embodiment, a sunlit illumination sensor 1 is comprised of three photoelectric conversion elements, for example, photodiodes $1g$, $1h$ and $1i$.

The three photodiodes of the sunlit illumination sensor have their light receiving surfaces which face the upwardness as viewed from the top of the vehicle and which are oriented differently. The photodiodes $1h$ and $1i$ are displaced from each other on the Y axis, making an angle $\phi_2$ therebetween which is preferably $20° \leq \phi_2 \leq 60°$, the angle $\phi_2$ being 40° in the illustration. The photodiode $1g$ displaces from either of the photodiodes $1h$ and $1i$ in the X-axis direction, making an angle $\phi_1$ to the Z axis, the angle $\phi_1$ being preferably $20° \leq \phi_1 \leq 60°$ and in the illustration, 20°. These photodiodes are mounted on a stand $12a$ having top surfaces 20° inclined as shown.

This embodiment, like the first embodiment, ensures that sunlit illumination correction can be effected by determining angles $\theta_1$ and $\theta_2$ on the basis of output currents $i_g$, $i_h$ and $i_f$ from the photodiodes $1g$, $1h$ and $1i$. The operation of sunlit illumination correction in this embodiment will now be described with reference to FIG. 19.

Figure 19:
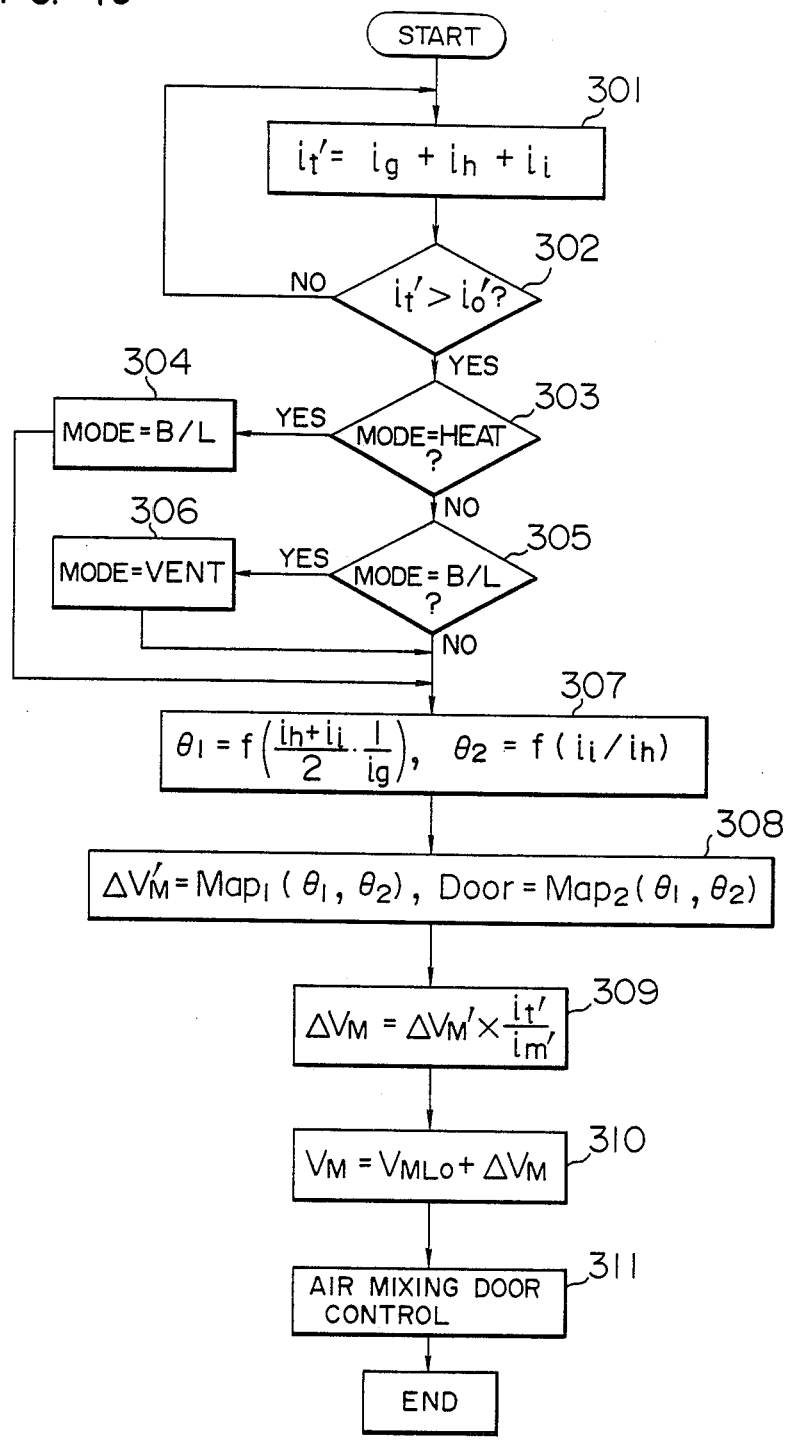
FIG. 19 is a flow chart for explaining the operation of the third embodiment.

In step 301 of FIG. 19, a sum current $i_t'$ of the output currents $i_g$, $i_h$ and $i_f$ is calculated. The sum current $i_t'$ is substantially proportional to intensity of the sunlight ray regardless of its direction.

In step 302, it is decided whether the current $i_t'$ exceeds a predetermined value $i_o'$. The predetermined value $i_o'$ is representative of a sum current $i_t'$ which occurs when intensity of the sunlight ray is at a minimum for which sunlit illumination correction is required. Accordingly, with the current $i_t'$ being in excess of the predetermined value $i_o'$, sunlit illumination correction is decided to be necessary and the procedure proceeds to step 303 but contrarily, with the current $i_t'$ being below $i_o'$, sunlit illumination correction is decided to be unnecessary and the procedure returns to the step 301.

Steps 303 to 306 are identical to the steps 103 to 106 of FIG. 5.

Approximate equations for $$\theta_1 = f\left(\frac{i_h + i_i}{2} \cdot \frac{1}{i_g}\right)$$

are obtained in advance from characteristic curves indicative of the relation between angle $\theta_1$ and current ratio $$\frac{(i_h + i_i)}{2} \cdot \frac{1}{i_g}$$

and approximate equations for $\theta_2 = f(i_i/i_h)$ are also obtained in advance from characteristic curves indicative of the relation between angle $\theta_2$ and current ratio $i_i/i_h$. Then, in step 307, the $\theta_1$ is determined from values of the currents $i_g$, $i_h$ and $i_i$ pursuant to the former approximation equations and the $\theta_2$ is determined from values of the currents $i_h$ and $i_i$ pursuant to the latter approximation equations.

Step 308 is identical to the step 108 of FIG. 5.

In step 309, the correction value $\Delta V_M'$ is multiplied by a correction value $i_t'/i_m'$ complying with intensity of the sunlight ray to provide an ultimate correction value $\Delta V_M$, where $i_m'$ is the sum of output currents of the photodiodes 1g, 1h and 1i which occurs when intensity of the sunlight ray is maximum.

Step 310 is identical to the step 110.

In step 311, the control signal is applied to the actuator 59 such that the temperature in the room can be lowered in accordance with the current value $i_t'$, thereby controlling the position of the air mixing door 52.

Like the first embodiment, the present embodiment can also afford to control air conditioning by using the currents $i_g$, $i_h$ and $i_i$ which are so corrected as to indicate the true intensity of the sunlight ray.

Further, as in the case of the second embodiment, the output circuits 70 can be connected in series with respective pairs of the photodiodes so that voltage signals may be used for air-conditioning control.

Accordingly, with the present embodiment, the two incident angles $\theta_1$ and $\theta_2$ can also be determined and the sunlit illumination correction can be effected sufficiently delicately to provide sufficient comfortableness.

While the invention has been described in connection with the embodiments using the particular number of photodiodes particularly arranged in the sunlit illumination sensor, the number of the photodiodes and the way to arrange them may be modified in various ways so long as the angle of the sunlight ray incident upon the righthand and lefthand sides of the vehicle and the angle of elevation of the sun relative to the vehicle horizontal plane can be measured.

As described above, according to the invention, the structurally simplified apparatus can detect delicate changes in the incident direction of the sunlight ray and can control flow rate distribution in the air conditioner in accordance with detection results, thus succeeding in eliminating prior art problems and attaining delicate temperature control well meeting sensible temperature to establish a sufficiently comfortable temperature environment with ease.

While the invention has been described by referring to the on-board automatic air conditioner of reheating-/air mixing type for illustration purpose only, it may also be applicable to other types of air conditioners.

We claim:

1. A vehicle air-conditioning control apparatus comprising:
    a sunlit illumination sensor including a plurality of photodetectors which have sensitivity characteristics varying with an incident angle of light and which are arranged such that their light receiving surfaces are oriented differently;
    a sunlit illumination correction controlling unit responsive to output signals of said plurality of photodetectors to produce sunlit illumination correction controlling signals; and
    an air conditioning unit for controlling temperatures in a room of a vehicle in accordance with the sunlit illumination correction controlling signals,
    said sunlit illumination correction controlling unit including incident angle calculation means which calculates, on the basis of the output signals of said plurality of photodetectors, an angle the sunlight ray makes to either of the righthand side and lefthand side of the vehicle and an angle of elevation of the sun relative to a horizontal plane of said vehicle and produces calculation results as the sunlit illumination correction controlling signals,
    said air conditioning unit including flow rate distribution control means, responsive to the calculated angle and the angle of elevation, for controlling air supply amounts to be distributed to the righthand and lefthand sides on a horizontal plane within the vehicle room.

2. A vehicle air-conditioning control apparatus according to claim 1 wherein said angle is defined as an angle between an axis vertical to said vehicle horizontal plane and a sunlit illumination direction toward either of the righthand and lefthand sides of said vehicle, and said angle of elevation is defined as an angle between said axis and a sunlit illumination direction toward either of the front and the rear of said vehicle.

3. A vehicle air-conditioning control apparatus according to claim 1 wherein said sunlit illumination correction controlling unit further comprises:
    summing means for calculating a sum of the output signals of said plurality of photodetectors; and
    means for deciding whether the sum of output currents exceeds a predetermined value,
    said sunlit illumination correction controlling unit being operative to deliver said sunlit illumination correction controlling signals when said deciding means decides that the sum of output signals exceeds said predetermined value.

4. A vehicle air-conditioning control apparatus according to claim 3 wherein said air conditioning unit further comprises means for changing the mode of air discharge to the interior of the room, said discharge mode changing means being operative to respond to said sunlit illumination correction controlling signals to change the discharge mode when the sum of output currents of said plurality of photodetectors exceeds said predetermined value.

5. A vehicle air-conditioning control apparatus according to claim 4 wherein said discharge mode changing means responds to said sunlit illumination correction controlling signals to change a HEAT mode representative of the discharge mode currently occurring to a B/L mode and to change the B/L mode representative of the discharge mode currently occurring to a VENT mode.

6. A vehicle air-conditioning control apparatus according to claim 3 wherein said sunlit illumination correction controlling unit further comprises discharge flow rate control signal generating means, responsive to the sum of output signals of said photodetectors, for producing as a sunlit illumination correction controlling signal a signal used to control the discharge flow rate, and said air conditioning unit further comprises means, responsive to the discharge flow rate controlling signal, for controlling the flow rate of air discharge to the interior of the room.

7. A vehicle air-conditioning control apparatus according to claim 3 wherein said sunlit illumination correction controlling unit further comprises discharge air temperature control signal generating means, responsive to the sum of output signals of said photodetectors, for producing as a sunlit illumination correction controlling signal a signal used to control the temperature of air discharge to the interior of the room, and said air conditioning unit further comprises means, responsive to the discharge air temperature controlling signal, for controlling the temperature of air discharge to the interior of the room.

8. A vehicle air-conditioning control apparatus according to claim 7 wherein said discharge air temperature controlling means is an air mixing door and the position of said air mixing door is controlled in response to the discharge air temperature control signal.

9. A vehicle air-conditioning control apparatus according to claim 6 wherein said discharge flow rate control signal generating means corrects the sum of output signals of said photodetectors in accordance with the angle and the angle of elevation and generates the discharge flow rate control signal in accordance with a corrected sum.

10. A vehicle air-conditioning control apparatus according to claim 7 wherein said discharge air temperature control signal generating means corrects the sum of output signals of said photodetectors in accordance with the angle and the angle of elevation and generates the discharge air temperature control signal in accordance with a corrected sum.

11. A vehicle air-conditioning control apparatus according to claim 1 wherein said incident angle calculation means calculates the angle and the angle of elevation in accordance with ratios between output signals of said plurality of photodetectors.

12. A vehicle air-conditioning control apparatus according to claim 11 wherein the number of said photodetectors is four, first and second photodetectors are arranged in the front/rear direction of the vehicle and third and fourth photodetectors are arranged in the right/left direction of the vehicle, and said incident angle calculation means calculates said angle in accordance with the ratio between output signals of said first and second photodetectors and said angle of elevation in accordance with the ratio between output signals of said third and fourth photodetectors.

13. A vehicle air-conditioning control apparatus according to claim 12 wherein said first and second photodetectors have their light receiving surfaces oriented differently in the front/rear direction of the vehicle, said third and fourth photodetectors have thier light receiving surfaces oriented differently in the right/left direction of the vehicle, and an angle between the light receiving surfaces of said first and second photodetectors and an angle between the light receiving surfaces of said third and fourth photodetectors respectively range from 20° to 60°.

14. A vehicle air-conditioning control apparatus according to claim 11 wherein the number of said photodetectors is three, first and second photodetectors are arranged in the right/left direction of the vehicle and a third photodetector is displaced from said first and second photodetectors in the front/rear direction of the vehicle, and said incident angle calculation means calculates said angle in accordance with the ratio between output signals of said first and second photodetectors and said angle of elevation in accordance with the ratio between an output signal of said third photodetector and a mean value of the output signals of said first and second photodetectors.

15. A vehicle air-conditioning control apparatus according to claim 14 wherein said first and second photodiodes have their light receiving surfaces oriented differently in the right/left direction of the vehicle, said third photodetector has its light receiving surface oriented differently from the light receiving surfaces of said first and second photodetectors in the front/rear direction of the vehicle, and an angle between the light receiving surfaces of said first and second photodetectors and an angle between the light receiving surface of said third photodetector and either of the light receiving surfaces of said first and second photodetectors respectively range from 20° to 60°.

16. A vehicle air-conditioning control apparatus according to claim 1 wherein said sunlit illumination sensor is disposed within said vehicle room.

17. A vehicle air-conditioning control apparatus according to claim 1 wherein said air conditioning unit is of a reheating/air mixing type.

* * * * *

UNITED STATES PATENT AND TRADEMARK OFFICE
CERTIFICATE OF CORRECTION

PATENT NO. : 4,760,772

DATED : August 2, 1988

INVENTOR(S) : HORIGUUCHI et al

It is certified that error appears in the above-identified patent and that said Letters Patent is hereby corrected as shown below:

On the title page, insert
--[30] Foreign Application Priority Data

December 3, 1986 [JP]      Japan......... 61-286810--

Signed and Sealed this

Twenty-sixth Day of December, 1989

Attest:

JEFFREY M. SAMUELS

*Attesting Officer*      *Acting Commissioner of Patents and Trademarks*